United States Patent Office 3,387,776
Patented June 11, 1968

3,387,776
GAUGING DEVICE INCLUDING FEEDBACK MEANS APPLYING A SIGNAL COMPARISON MEANS TO CONTROL THE LEVEL OF A DETECTED SIGNAL
Peter Frederic Thomas Cryer Stillwell, Aldershot, John Denzil Barr, Leicester, and Thomas Charles Reeve, Worthing, England, assignors, by mesne assignments, to The Rank Organisation Limited, London, England, a British company
Filed Aug. 7, 1964, Ser. No. 388,197
11 Claims. (Cl. 324—61)

ABSTRACT OF THE DISCLOSURE

This invention is an apparatus for measuring the surface irregularities of a workpiece. An oscillator is connected to the workpiece and a signal from the oscillator is detected by a probe mounted adjacent to the workpiece. The probe signal is applied through appropriate amplifiers and detectors to a comparator. A reference generator applies a second signal to the comparator and the output of the comparator is fed back through an output display to control the amplification of a variable amplifier connected between the probe and the detector. The feedback signal is directly related to the surface irregularities of the workpiece. Alternate embodiments of the invention include connecting the variable amplifier between the oscillator and the workpiece and connecting the output display to the workpiece rather than the feedback circuit.

---

This invention is concerned with improvements in or relating to non-contacting measurement, and is concerned especially, but not exclusively with an apparatus and a method for determining the contour of a workpiece without making physical contact with it.

According to one aspect of the present invention there is provided an apparatus for measuring the distance between sensing means and the surface of an object, such as a workpiece, without touching said object, comprising energising means for imparting radio frequency electromagnetic energy to a gap between said sensing means and said object, amplification responsible to signals from said sensing means, and feedback means deriving an output from said amplification means after comparison with a reference quantity, whereby a measure of the distance between said sensing means and said object may be obtained by an instrument at an appropriate point in the circuit.

According to another aspect of the present invention there is provided a method of measuring the distance between sensing means and the surface of an object, such as a workpiece, without touching said object, including the steps of imparting radio frequency electromagnetic energy to a gap between said sensing means and said object, amplifying the signal present in said sensing means, comparing said amplified signal with a reference quantity to produce a feedback signal, and applying said feedback signal to control said radio-frequency electromagnetic energy, and measuring the signal present at an appropriate point in the circuit to obtain a measure of said distance.

Embodiments of the apparatus and method according to the present invention will now be particularly described hereinafter by way of example with reference to the accompanying drawings, in which.

Figure 1:
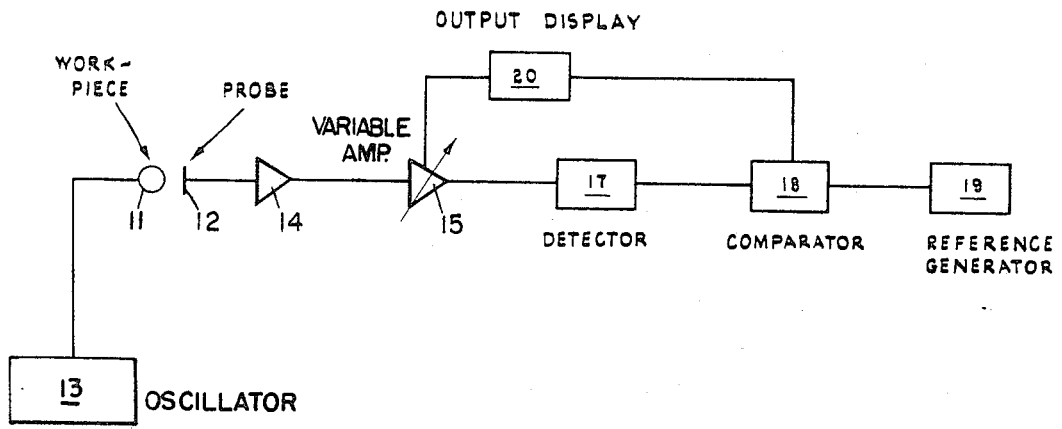
FIGURE 1 is a schematic diagram, in block form, of a first embodiment, in which feedback is applied to the sensing means of the apparatus.

Referring to FIGURE 1 of the drawings, a workpiece 11, the surface shape of which is to be measured without touching the workpiece, is arranged close to sensing means in the form of a capacitive probe 12. The probe 12 is in the shape of a plate and guard ring, not shown, which form a three terminal capacitor with the workpiece 11 as the third element. The probe is, for example, made of a metal tube blanked at one end, with a fine insulated wire passed through the centre of the blanked end, and cut off flush with the end. This gives a plate area area approximately equal to the cross-sectional area of the wire.

The workpiece 11 is supplied with radio frequency electromagnetic energy from an oscillator 13, and a small fraction of the workpiece signal is transmitted to the guarded plate, that is to say the fine insulated wire, of the probe 12 by virtue of the capacity existing between the workpiece 11 and the probe 12.

The radio frequency signal from the probe 12 is fed to a fixed gain amplifier 14 which is then followed by the amplifier 15 having variable gain. The amplifier 15 is succeeded by a detector 17 which rectifies the radio frequency signal. The rectified signal is then fed to a comparator 18 where it is compared with a reference quantity, in this case a reference voltage, from a reference generator 19. The output from the comparator 18 is a current signal and is applied as feedback to the variable gain amplifier 15. This amplifier 15 comprises a single transistor connected in common base whose gain varies substantially linearly with the input current.

In this embodiment therefore, a form of direct current feedback is used in a stage 15 in which the alternating current gain varies directly with the mean input current.

The feedback current is directly proportional to variations in the distance between the workpiece 11 and the probe 12, and is measured on a suitable instrument 20.

Figure 2:
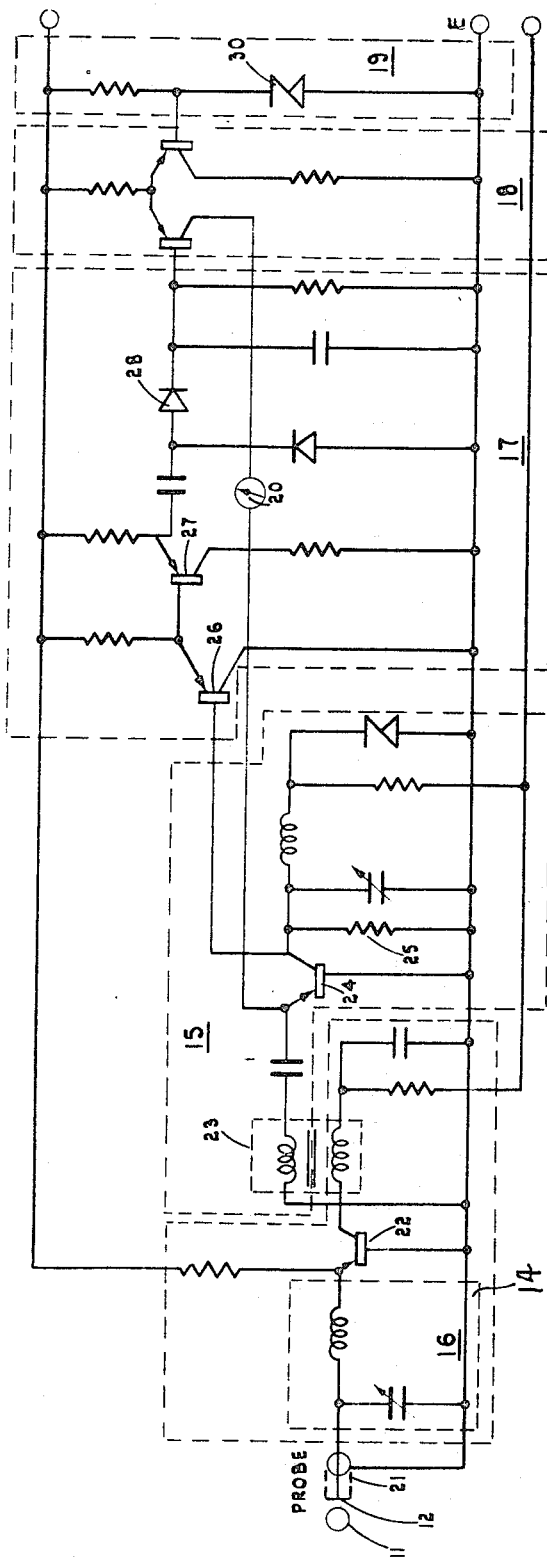
FIGURE 2 is a detailed circuit diagram of the embodiment shown in FIGURE 1.

Referring to FIGURE 2 of the drawings, the probe signal is fed via a screened lead 21 forming part of the guard ring, that is the metal tube, into the tuned input circuit 16 of a common base transistor 22. The tuned circuit effectively tunes out the unwanted capacity of probe lead to screen.

A small A.C. current is developed in the probe 12 and this is magnified by the resonance effect of tuned circuit provided in the amplifier 14. The circulating current in the tuned circuit 16 now represents a current signal to the common base transistor 22 and the signal is amplified and appears across a transformer winding in the collector circuit of this transistor 22.

The signal is transformer coupled to the second amplifier stage 15, the transformer 23 providing a low impedance constant voltage source of R.F. signal, necessary when applying current feedback in this second stage 15. The second stage 15 consists of another voltage amplifier comprising a transistor 24 connected in common base, whose gain varies substantially linearly with input current, as referred to hereinabove.

The transistor 24 has a tuned circuit as its load and provides further voltage amplification for the signal, which at this point may be approximately 5 v. peak to peak.

A damping resistance 25 is included in the load circuit to decrease the resonance effect and hence to improve stability. The resistance 25 also exerts some control over the sensitivity of the circuit.

The signal is then fed through an impedance changing network, including a pair of transistors 26 and 27, to the detector 17.

In the detector 17 the R.F. signal is clamped above earth, that is to say its most negative excursion is restored to earth potential, and then rectified in the diode 28 to provide a D.C. signal of the order of +5 volts which can be compared against a reference voltage of similar magnitude in a long-tailed pair circuit making up the comparator 18. The reference voltage is produced in the reference voltage generator 19, and is derived from a zener diode 30 with a very low temperature coefficient of voltage variation. Both transistors in the long tailed pair respond to change in the D.C. signal, and hence to changes in distance between probe 12 and workpiece 11, and the current in the appropriate transistor is fed back to the variable gain stage 15 in antiphase so that the output from this stage 15 remains substantially constant.

An instrument in the form of a D.C. milliammeter 20, accurate to better than 1% is connected in the feedback path and this monitors the feedback current which will vary substantially linearly with change in the distance between the probe 12 and the workpiece 11.

The sensitivity obtained with this embodiment was of the order of one milliampere per thousandth of an inch of spacing between probe 12 and workpiece 11.

Figure 3:
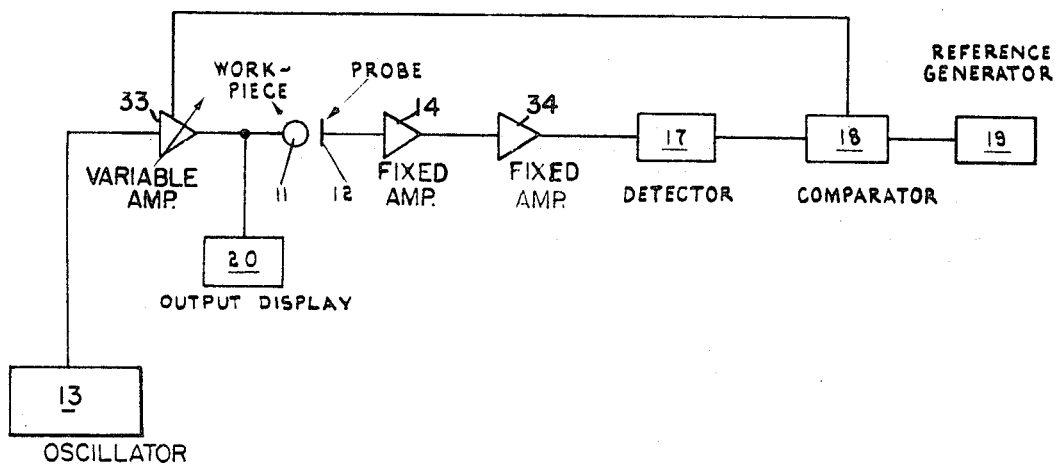
FIGURE 3 is a schematic diagram, in block form, of a second embodiment in which feedback is applied to the workpiece signal.

In a second manner of carrying the invention into effect, the feedback is applied to the signal to the workpiece instead of to the probe amplifier 15 as described with reference to FIGURE 1. Referring to FIGURE 3 of the drawings, the feedback current derived in a comparator 18 as before, is introduced into a variable gain stage 33 connected between an oscillator 13 and the workpiece 11. In this way the amplitude of the carrier signal varies in response to changes of distance at the probe 12. Since the probe 12 is within the feedback loop any changes of distance at the probe producing a variation of the carrier signal are immediately referred back via the comparator 18 and the variable amplifier, to be compensated for at the workpiece 11. This results in a linear change of carrier signal with distance regardless of the degree of linearity in the variation of gain of the variable gain stage 33.

The basic probe circuit is much the same as that of the first embodiment hereinabove described except that the second stage probe amplifier 34, corresponding to the amplifier 15 in FIGURES 1 and 2, is of fixed gain. The variable gain stage 33 used in the carrier signal circuit may be identical to that used in the previous embodiment. This stage is followed by another fixed gain stage, not shown, in order to attain the required R.F. signal level.

A valve voltmeter may be used to measure the signal at the workpiece 11 or alternatively a small transistor detector and display could be used as an instrument 20.

In this embodiment the stage 33 is arranged so that its gain is varied by the application of a feedback signal derived from the probe 12 such that the signal on the workpiece 11 changes to keep the output from the probe 12 constant and hence from the signal amplifier 34 substantially constant. The signal on the workpiece 11 is then indicated on the instrument 20 as a measure of the distance between the workpiece 11 and the probe 12.

The sensitivity of this embodiment was found to be of the order of two volts per thousandth of an inch distance, when using a probe with an effective diameter of about 0.013 in.

A further method of carrying the invention into effect is similar to the previous one described with reference to FIGURE 3, only in this case the earthing arrangements have been altered so that the workpiece 11 may be at earth potential.

Figure 4:
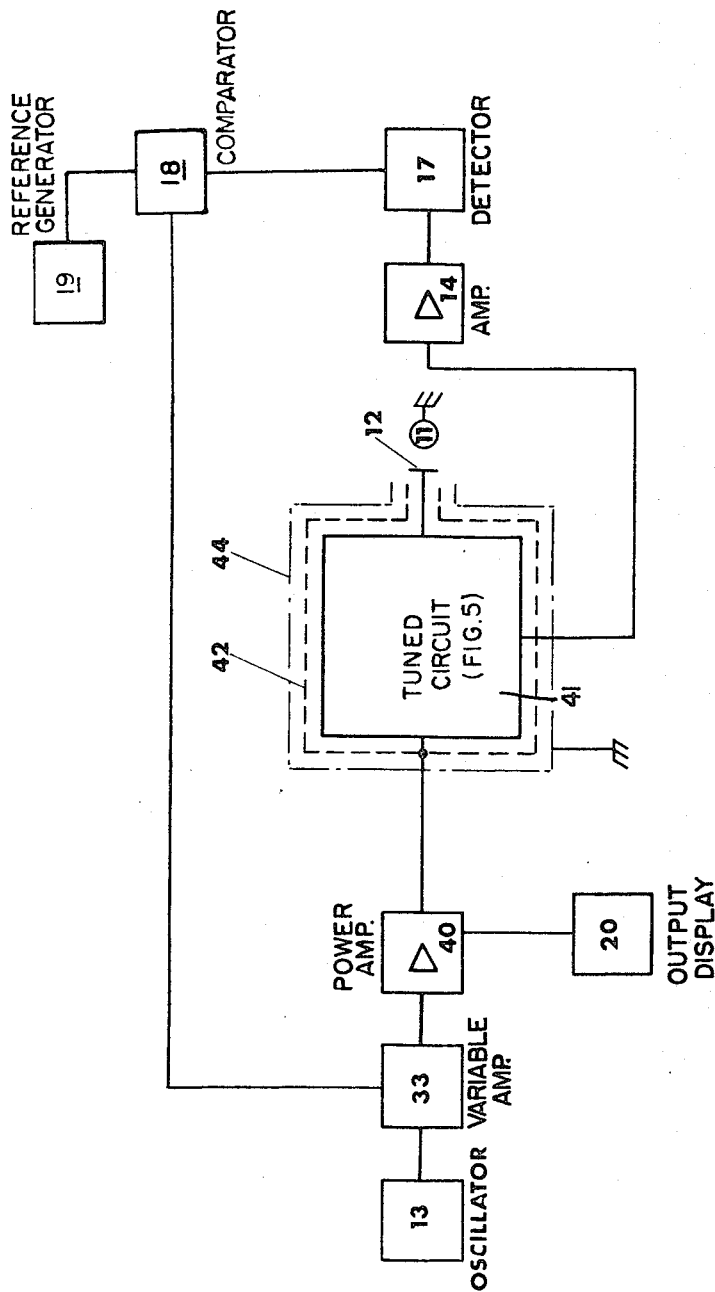
FIGURE 4 is a schematic diagram, in block form, of a third embodiment, in which the workpiece is earthed.

Referring to FIGURE 4, the feedback is applied to the radio frequency signal from the oscillator 13, as before. The signal from the oscillator 13 is amplified in a variable gain stage 33 and then drives a power amplifier stage 40. The output of the power amplifier 40 is imposed on the gap between the probe 12 and the workpiece 11, through a tuned circuit 41 best illustrated in FIG. 5. The tuned circuit 41 and the centre conductor of the probe 12 are shielded from earth by a screen 42, see also FIGURE 5, connected to the output of the power amplifier 40, this way, the capacity between the probe centre conductor and the screen 42 forms part of the tuning capacity of the tuned circuit 41, and the only capacity to earth is from the end face of the probe centre conductor.

Figure 5:
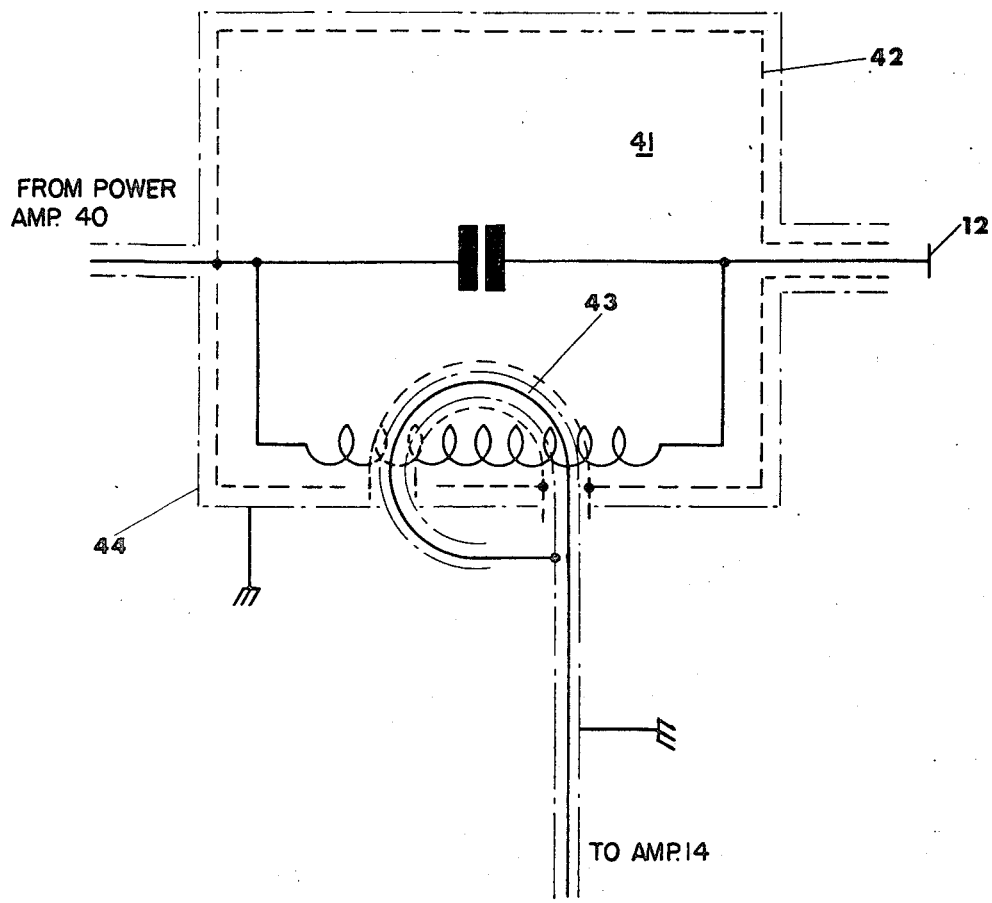
FIGURE 5 is a diagram of the tuned circuit and coupling arrangements of the embodiment shown in FIGURE 4.

In operation an R.F. current will flow through the gap between the probe 12 and the workpiece 11, which is earthed, due to the signal from the power amplifier 40. This current is the only current flowing through the tuned circuit 41 provided that the screening 42 be adequate and it causes a larger circulating current to flow in the tuned circuit 41 due to the resonance effect of the tuned circuit 41. A carefully screened coupling loop 43, see FIGURE 5, monitors the current flowing in the inductive element of the tuned circuit 41 and is connected to the input of the probe amplifier 14. Turning now to FIGURE 5, the coupling loop 43 consists of a conductor surrounded by an earthed screen to avoid capacity pick-up from the power amplifier 40. This is further surrounded by a heavy screen connected to the screen 42 around the tuned circuit 41 to avoid stray capacity to earth from the tuned circuit 41. It is important to have very thorough screening of the tuned circuit 41 from earth because otherwise there will be a large standing signal in the coupling loop 43 which will reduce the effective range of the apparatus. It was found necessary in this embodiment to use a solid screen 42, and metal tubing for the outer screen of the coupling loop 43. The tuned circut 41 and the centre conductor of the probe 12 are further shielded by a screen 44 connected to earth. This reduces the stray radiation of the apparatus. The capacity between the two screens 42 and 44 forms part of the tuning capacity of the output circuit of the power amplifier 40.

The output signal from the probe amplifier 14, see FIGURE 4, is rectified in a detector 17 and the resulting D.C. voltage is compared with a reference voltage 19 in a comparator 18, as before. The feedback current derived in the comparator 18, is fed to the variable gain stage 33, as before, connected between the oscillator 13 and the power amplifier 40. In this way the amplitude of the carrier signal varies in response to changes of distance at the probe 12. Since the probe 12 is within the feedback loop any changes of distance at the probe producing a variation of the carrier signal are immediately referred back via the comparator 18 and the carrier amplifier, to be compensated for at the probe 12.

Here again the basic probe circuit is much the same as that of the first embodiment except that the entire probe amplifier 14 is run at fixed gain instead of variable gain. The variable gain stage 33 used in the carrier signal circuit may be identical to that used in the first embodiment. Alternatively the oscillator 13 output level could be controlled by the feedback signal from the comparator 18 directly. This is not so advantageous because it tends to alter the frequency of the oscillator output 13 with the changes in amplitude.

Indication of the distance between the probe 12 and the surface of the workpiece 11 is given by the amplitude of the signal at the output of the power amplifier 40. This may be shown by the usual means 20, for example by a valve voltmeter or a rectifier.

In this embodiment again the stage 33 is arranged so that its gain is varied by the application of a feedback signal derived from the probe 12 such that the drive signal from the power amplifier 40 changes to keep the output from the probe 12 to the probe amplifier 14 and hence to the detector 17 substantially constant. The signal from the power amplifier 40 is then indicated on the instrument 29 as a measure of the distance between the workpiece 11 and the probe 12.

In both the embodiments shown in FIGURES 3 and 4, it is possible to adjust the sensitivity of the apparatus by adjusting the gain of the probe amplifier 14.

It will be appreciated that by means of the apparatus and method according to the present invention it is possible to measure with great sensitivity the surface shape on soft materials without touching and thereby damaging the specimen surface. A further advantage is that all the available signal is used since no balance or null condition is needed, and the method does not require elaborate bridge design which would be necessary for the direct measurement of capacity. The linear nature of the relationship in the second and third embodiments between the measured signal and the distance between the workpiece 11 and the probe 12 is of particular advantage, and it will also be appreciated that the second and third embodiments are self-protecting, as the signal level decreased with decrease of distance, so that on contact it will be zero if sufficient control is provided.

We claim:
1. A system for detecting and measuring the surface irregularities of a workpiece comprising:
   a probe mounted adjacent to but out of physical contact with said workiece;
   a signal generator having its output connected to said workpiece;
   a detector connected to the output of said probe;
   a reference generator;
   a comparator having one input connected to the output of said reference generator and a second input connected to the output of said detector; and
   feedback means connected to the output of said comparator for feeding back a control signal to control the level of the signal detected by said detector, the value of said feedback signal being related to the surface irregularities of said workpiece.
2. A system as claimed in claim 1 including:
   a variable amplifier connected between said probe and said detector and having a control input;
   an output display; and
   the output of said comparator being connected through said output display to the control input of said variable amplifier.
3. A system as claimed in claim 2 including a fixed amplifier connected between the output of said probe and the input of said variable amplifier.
4. A system as claimed in claim 3 wherein said signal generator is an oscillator.
5. A system as claimed in claim 1 including:
   a variable amplifier connected between said signal generator and said workpiece and having a control input connected to the output of said comparator; and
   an output display connected between said variable amplifier and said workpiece.
6. A system as claimed in claim 25 including:
   a fixed amplifier connected between said probe and said detector.
7. A system as claimed in claim 6 wherein said signal generator is an oscillator.

8. A system for detecting and measuring the surface irregularities of a workpiece comprising:
   a signal generator;
   a variable amplifier having a control input and a signal input;
   a probe mounted adjacent to but out of physical contact with said workpiece;
   said probe capacitively coupled to said workpiece;
   the output of said signal generator connected to said signal input of said variable amplifier, the output of said variable amplifier connected to said probe to energize the space between said probe and said workpiece;
   a detector connected to said probe;
   a reference generator;
   a comparator having one input connected to the output of said reference generator and a second input connected to the output of said detector; and
   feedback means connected from the output of said comparator to said control input of said variable amplifier for varying the output of said variable amplifier.
9. A system as claimed in claim 8 including:
   a tuned circuit and a power amplifier connected between said variable amplifier and said probe, said detector being connected through said tuned circuit to said probe; and
   an output display connected to said power amplifier.
10. A system as claimed in claim 9 including an amplifier connected between said tuned circuit and said detector.
11. A system as claimed in claim 10 wherein said tuned circuit comprises a shielded capacitive-inductance tank circuit and wherein said connection to said amplifier comprises a shielded loop surrounding the inductor of said tank circuit.

References Cited
UNITED STATES PATENTS

| | | | |
|---|---|---|---|
| 2,656,507 | 10/1953 | Fielden | 324—61 |
| 2,898,550 | 8/1959 | Fischer | 324—61 |
| 2,948,850 | 8/1960 | Ederer | 324—61 |
| 3,077,858 | 2/1963 | Uhg | 324—61 X |
| 3,089,332 | 5/1963 | Comstock | 324—61 X |
| 3,122,956 | 3/1964 | Jucker | 324—61 X |
| 3,187,256 | 6/1965 | Foster | 324—61 |
| 3,263,167 | 7/1966 | Foster et al. | 324—61 |
| 3,316,486 | 4/1967 | Woods | 324—34 |

FOREIGN PATENTS 1,368,378   6/1964   France.

OTHER REFERENCES

German Printed Application No. 1,081,677, Pub. May 12, 1960, 324–61.

Foster: "Non-Contacting Self-Calibrating Vibration Transducer," Instrumentation and Control Systems, December 1963, vol. 36, pp. 83 and 84.

RUDOLPH V. ROLINEC, *Primary Examiner.*

E. E. KUBASIEWICZ, *Assistant Examiner.*

UNITED STATES PATENT OFFICE
CERTIFICATE OF CORRECTION

Patent No. 3,387,776                 June 11, 1968

Peter Frederic Thomas Cryer Stillwell et al.

It is certified that error appears in the above identified patent and that said Letters Patent are hereby corrected as shown below:

Column 5, line 58, claim reference numeral "25" should read -- 5 --.

Signed and sealed this 14th day of October 1969.

(SEAL)
Attest:

Edward M. Fletcher, Jr.          WILLIAM E. SCHUYLER, JR.
Attesting Officer                Commissioner of Patents